United States Patent Office 3,764,330
Patented Oct. 9, 1973

3,764,330
COLOR PHOTOGRAPHIC LIGHT SENSITIVE
ELEMENTS
Willard E. Vary, 4734 Bromley Ave.,
Bradbury Park, Md. 20023
Filed May 25, 1970, Ser. No. 40,015
Int. Cl. G03c 1/76, 1/84, 7/00
U.S. Cl. 96—69                                    8 Claims

ABSTRACT OF THE DISCLOSURE

A color photographic light sensitive element having one or two color emulsion layers each layer being sensitized to only one of the red, green, or blue primary colors.

STATEMENT OF GOVERNMENT INTEREST

The invention described herein may be manufactured and used by or for the Government of the United States of America for governmental purposes without the payment of any royalities thereon or therefor.

BACKGROUND OF THE INVENTION

This invention relates to color photographic light-sensitive elements and more particularly to elements having only one or two emulsion layers each layer being sensitized to only one primary color.

This invention is a companion of my copending application, Ser. No. 40,400, filed of even date herewith, and now Pat. No. 3,643,569, that disclosure being incorporated here by reference.

Modern color films consist of three emulsion layers each layer being sensitized to one of the three primary colors. When it is desired to record only one or two colors, it becomes necessary to place suitable filters over the camera lens. By having a color film sensitive to only one or two primary colors the use of filters may be eliminated. As an example, the detection of rust or blight in trees and vegetation may be achieved with the films of this invention by sensitizing the one or two emulsions used to whatever light wavelength is necessary to detect the diseases.

Other particularly useful applications of the present invention lie in underwater and aerial color photography. However, when making color photographic records in and through the atmosphere and water, a number of factors, such as refraction, scatter, and absorption of light must be taken into consideration. The total effect may be cumulative, as any or all of these factors may be operative for the light incident on, and reflected from, the subject to be photographed. Blue light is particularly detrimental to optimum color photography because it is the most scattered and least absorbed light under the surface of water in addition to there being much blue light scattering above water in the atmosphere known as "aerial haze." Also in color-corrected lenses, the blue light cannot be focussed at the same plane as the green and red light.

For the above reasons, it has been necessary to filter out practically all of the blue light when taking aerial and underwater photographs with today's three layered emulsion color films. Additionally, it requires at least two stops more camera exposure to record ocean bottom detail than that required for land terrain photography. It is often impossible to obtain the increased exposure required because many aerial cameras are limited to a maximum aperture of f/5.6 and when flying at low altitudes, the slowest practical shutter speed that can be utilized is 1/125 second. Also, when exposing for deep water, the shallow water areas and coastal land terrain tend to become overexposed.

The use of filters over the camera lens compound the problems because they require increased exposures to compensate for the filter factor. Also, when a filter is used to absorb a certain undesired color, the layer of emulsion sensitized to the color being absorbed will be unexposed. In processing, the dye which is complementary to the color of the sensitized unexposed layer, will be deposited in that layer resulting in an image tinged with the complementary color. Gelatin filters are thin dyed filters that are extremely fragile. They fade or change color on prolonged exposure to sunlight and are easily damaged by fingerprints. Also, they readily collect dirt and dust attracted by static electricity, deform readily with changes in temperature and humidity, and seldom can be held in a flat plane parallel to the film. The commonly used optical glass filters are expensive, fade or change color on prolonged exposure to sunlight, are easily scratched when dust or dirt is cleaned from the surfaces, affect the sharpness and resolution of the imagery, and require frequent calibration to determine the degree of color change that has occurred.

OBJECTS OF THE INVENTION

It is an object of this invention to provide a color film which does not require a filter over the camera lens to block out undesired light.

Another object of this invention is to provide a color film which is unaffected by atmospheric and underwater hazes.

An additional object of this invention is to eliminate image fuzziness common to color corrected camera lenses.

A further object of this invention is to provide a color film which has a faster speed and gives a better image contrast than conventional three-layer color films.

A still further object is to provide a color film which may be processed and dried in less time than conventional three-layer color films.

Other objects, advantages and novel features of the present invention will become apparent from the following detailed description of the invention when considered in conjunction with the accompanying drawings.

SUMMARY OF THE INVENTION

The objects and advantages of this invention can be attained by the use of a unilayer or duolayer color emulsion film with each layer being sensitized to a predetermined primary color. The invention also includes the use of appropriately placed antihalation filters.

The emulsion layers are sensitized with known dyes selected to be sensitive in a single layer to the light of the color to be recorded. Such color-sensitive dyes, per se, are well known in the art as shown in U.S. Pats. 2,113,329, 2,423,730, 2,368,489, 2,600,788, 2,298,443 and 2,937,086. Anti-halation and general purpose filters sensitized to absorb selected light ranges are set forth as commercially available products in the Eastman-Kodak publication "Kodak Wratten Filters," 19th ed., Kodak publication number B-3, 1957, by Eastman Kodak.

DESCRIPTION OF THE PREFERRED
EMBODIMENTS

Figure 1:
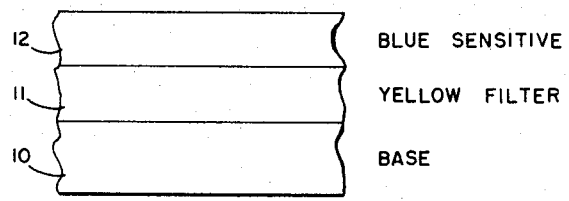
FIG. 1 is an enlarged sectional view of a unilayer emulsion sensitized to blue light.
Figure 2:
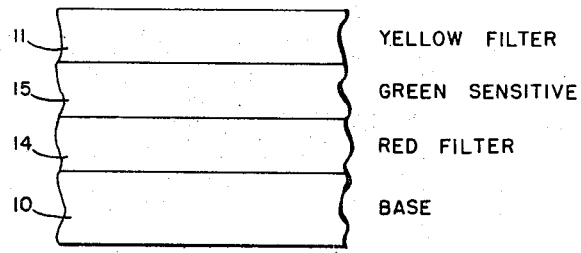
FIG. 2 is an enlarged sectional view of a unilayer emulsion sensitized to green light.
Figure 3:
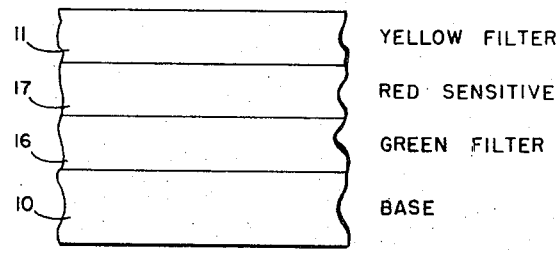
FIG. 3 is an enlarged sectional view of a unilayer emulsion sensitized to red light.

In the accompanying drawings, FIGS. 1, 2 and 3 are enlarged sectional views of color photographic elements having only one sensitized emulsion layer. As shown in FIG. 1, a base 10 of any suitable material such as a flexible transparent base, opaque base, or rigid transparent base (such as glass or thick plastic) is coated with a yellow filter layer 11. This filter layer will absorb substantially all light below 510 millimicrons and will prevent blue light which passes through the blue sensitive emulsion layer 12 from being reflected or refracted back into the blue sensitive emulsion and resulting in deterioration of the imagery formed by the incident blue light. The top of the yellow filter is coated with an emulsion sensitive to blue light. The light wavelength sensitivity of the blue emulsion will extend from 400 millimicrons to 500 millimicrons and will be peaked at 440–450 millimicrons, with at least 90% sensitivity in that range and approximately 1% sensitivity at 500 millimicrons. A hardened overcoating of a transparent antiabrasive may be provided to prevent damage to the sensitized layer during the handling and process steps.

FIG. 2 illustrates a green sensitive unilayer photographic film element. Here base 10 is coated with a red filter 14. This filter will absorb substantially all light below 610 millimicrons and will prevent green light from reflecting back from the base and causing a deterioration in the imagery of the green emulsion. The red filter is covered with an emulsion 15 sensitized to wavelengths of green light in the range of 520 to 580 millimicrons. The emulsion should have 80% sensitivity between 540 and 560 millimicrons with at least 95% at the peak of 550 millimicrons. Above the green sensitive emulsion unilayer is the previously mentioned yellow filter 11 and an optional antiabrasion coating.

In FIG. 3 is shown the red sensitive unilayer emulsion photographic film element. Covering the base 10 is green filter 16. This filter will absorb substantially all red light passing through the red sensitized layer below 720 millimicrons and prevent it from being reflected or refracted back into the red sensitized layer resulting in deterioration of the imagery formed by the incident red light. Upon filter 16 is the unilayer emulsion sensitized to red light wavelengths from 580 to at least 700 millimicrons. The sensitivity should be peaked at 620 millimicrons with 80% sensitivity from 600 to 640 millimicrons. Above the red sensitive emulsion layer is the previously mentioned yellow filter 11 with an optional antiabrasion coating.

Figure 4:
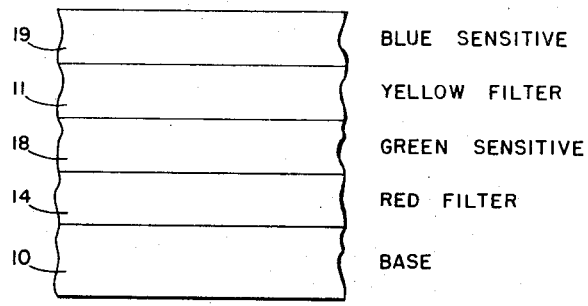
FIG. 4 is an enlarged sectional view of a duolayer emulsion sensitized to blue and green light.
Figure 5:
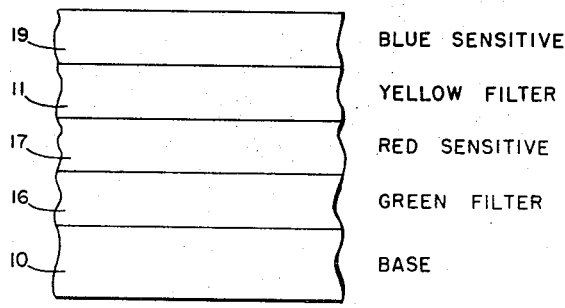
FIG. 5 is an enlarged sectional view of a duolayer emulsion sensitized to red and blue light.
Figure 6:
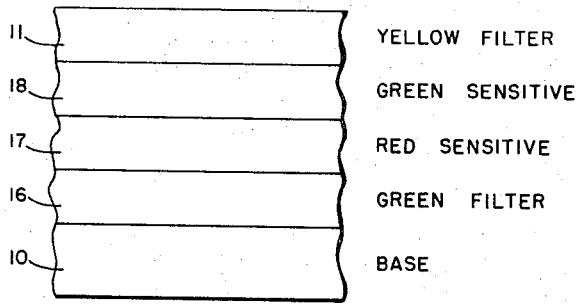
FIG. 6 is an enlarged sectional view of a duolayer emulsion sensitized to red and green light.

FIGS. 4, 5 and 6 are illustrative of color photographic elements having a two layer or duolayer color emulsion. These elements are used where two primary colors are of main interest and the third primary color is of secondary importance or is actually interfering with the optimum recording of the wanted colors. Each emulsion layer is sensitized to a single primary color.

An enlarged sectional view of a blue-green sensitive duolayer emulsion photographic element is shown in FIG. 4. Upon the base 10 is a red filter 14 which absorbs substantially all light below wavelengths of 610 millimicrons. This will prevent any green light passing through the green sensitive emulsion layer from being reflected back and causing deterioration formed by the incident green light. Upon the red filter is an emulsion 18 sensitized to green light wavelengths of 510–580 millimicrons. This emulsion will have 80% sensitivity at 540–560 millimicrons and at least 95% sensitivity at the peak of 550 millimicrons. Over the green sensitive emulsion layer is yellow filter 11. This yellow filter absorbs substantially all light having wavelengths below 510 millimicrons and thereby prevents blue light from exposing the green sensitive emulsion layer below. Above the yellow filter is a blue sensitized emulsion layer 19. The sensitivity of this layer extends from 400 millimicrons to 520 millimicrons with 90% sensitivity at a peak of 450 millimicrons. The peak should be broad having 80% sensitivity at 440 and 460 millimicrons. The blue and green emulsion sensitivities overlap in the 510–520 millimicron range to prevent sensitivity gaps between the two colors. Above the blue sensitive layer may be an antiabrasion layer as previously described.

FIG. 5 illustrates the blue-red sensitive emulsion duolayer photographic element of this invention. Above base 10 is green filter 16, red sensitive layer 17 and yellow filter 11. These layers, their ordering, function and characteristics are the same as the unilayer emulsion previously described and shown in FIG. 3. However, a blue sensitive layer 19 has been located upon the yellow filter 11. The blue sensitive layer 19 is the same as that described in FIG. 4.

A green-red duolayer emulsion photographic element is shown in FIG. 6. The purpose of the green filter 16 above base 10 is to prevent red light reflection below 720 millimicrons back into the red sensitized emulsion layer 17 from said base 10. Also, yellow filter 11 is above green sensitive emulsion 18 to prevent blue light from exposing the inherent blue sensitivity in the red and green sensitized layers. The red sensitized emulsion layer 17 and the green sensitized emulsion layer 18 are the same as described in FIGS. 4 and 5.

All of the unilayer and duolayer color photographic films described may be processed to color negative or to color positive with the same chemistry and processing techniques used in conventional three layer emulsions which are well known to those skilled in the art. It is further contemplated that the aforementioned filters typically made of dyes, colloidal silver, or other materials well known in the art will be dissolved during the processing steps. The emulsion may be of the gelatino-silver halide type or any others known in the art. The optional antiabrasion layer may be a separate layer or incorporated into the top filter or emulsion layers as described in U.S. Pat. No. 2,725,296.

Because the unilayer and duolayer emulsions can be penetrated more readily with processing solutions, but will absorb less water because of less thickness, the processing and drying times will be effectively reduced over times normally required for conventional three-layer emulsions.

In addition to quicker processing times, the unilayer and duolayer films will have a higher resolution in the recorded imagery, will have a greater effective film speed, and afford better contrasts. These advantages are of prime importance in aerial photography of forests, waterways, military targets, and underwater terrain. They are also important in underwater photography and in other fields of science such as biology, ecology, physiology, metallurgy, microscopy, graphic arts, lithography and television.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. In color photography, the step of applying an antihalation filter upon a main supporting base element, and then applying at least one but not more than two layers of a light-sensitive emulsion over said antihalation filter, each of said light-sensitive emulsion layers being of a different pure primary color selected from the group consisting of blue, red and green, each emulsion layer being sensitive to light in the sensitizing range of its selected color, said antihalation filter being absorptive of the light active to expose said light-sensitive layer superimposed next adjacent thereon, exposing said light sensitive emulsion and filter assembly to light in a range including each of said selected colors and then developing said emulsions to photographically produce an image of said light-sensitive layers, each in its selected pure color.

2. The color photographic method as defined in claim 1 wherein said light-sensitive emulsion is a single layer emulsion sensitized to blue light in the range of 400 to 500 millimicrons and said antihalation filter absorbs substantially all wave lengths of blue light below 510 millimicrons.

3. The color photographic method as defined in claim 1 wherein the light-sensitive emulsion is a single layer emulsion sensitized to green light in the range of 520 to 580 millimicrons, said emulsion layer having superimposed thereon a second upper absorptive filter which will absorb substantially all blue light below 510 millimicrons.

4. The color photographic method as defined in claim 1 wherein the light-sensitive emulsion is a single layer emulsion re-sensitized to wave lengths of red light in the range of 580 to 700 millimicrons, said antihalation filter being absorptive of wave lengths of green and red light below 720 millimicrons, said emulsion layer having a second light absorptive filter layer superimposed thereon which will absorb all wave lengths of blue light below 510 millimicrons.

5. Color photographic method as defined in claim 1 wherein said emulsion comprises two separate light-sensitive emulsion layers, a first light-sensitive emulsion layer being sensitive to green light in the range of 510 to 580 millimicrons mounted upon said antihalation filter, the antihalation filter upon which such first emulsion layer is mounted being absorptive of green light below about 610 millimicrons, an intermediate absorptive filter disposed upon said first green-sensitized emulsion layer, said intermediate filter layer being absorptive of all wave lengths of blue light below about 510 millimicrons, and a second light-sensitive emulsion layer sensitized to blue light in the range of 400 to 520 millimicrons disposed upon said intermediate absorptive filter.

6. Color photographic method as defined in claim 1 wherein said emulsion comprises two separate light-sensitive emulsion layers, a first light-sensitive emulsion layer sensitive to red light in the range of 580 to 700 millimicrons mounted upon said antihalation filter, said antihalation filter being absorptive to green and red light below about 720 millimicrons, an intermediate filter absorptive of all wave lengths of blue light below 510 millimicrons disposed upon such red-sensitized emulsion layer, and a second light-sensitive emulsion layer sensitized to all wave lengths of blue light in the range of 400 to 520 millimicrons disposed on said intermediate absorptive filter.

7. Color photographic method as defined in claim 1 wherein said emulsion comprises two separate light-sensitive emulsion layers mounted upon said antihalation filter, said antihalation filter being absorptive to red and green light below 720 millimicrons, and one of said light-sensitive emulsion layers being sensitive to red light in the range of 580 to 700 millimicrons and the other light-sensitive emulsion being sensitized to green light in the range of 510 to 580 millimicrons, and a second filter absorptive of all wave lengths of blue light below 510 millimicrons superimposed upon said light-sensitive emulsion layers.

8. The color photographic method as defined in claim 7 wherein said re-sensitized emulsion layer is disposed as the lower and green-sensitized emulsion layer is disposed as the upper of said light-sensitized emulsion layers.

References Cited

UNITED STATES PATENTS

| Number | Date | Name | Class |
|---|---|---|---|
| 1,956,274 | 4/1934 | Comstock | 96—84 |
| 1,984,504 | 12/1934 | Biehler | 96—84 |
| 2,078,398 | 4/1937 | Mannes | 96—84 |
| 2,159,600 | 5/1939 | Murray | 96—22 |
| 3,398,145 | 8/1968 | Bailey | 96—84 |
| 3,475,173 | 10/1969 | Kimura | 96—84 |
| 3,547,639 | 12/1970 | Maurer | 96—84 |
| 2,500,045 | 3/1950 | Sawdey | 96—84 |
| 2,527,583 | 10/1950 | Silberstein | 96—84 |
| 2,621,125 | 12/1952 | Van Dormael | 96—84 |
| 1,447,759 | 3/1923 | Christensen | 96—68 |
| 2,010,459 | 8/1935 | Mannes | 96—69 |
| 2,143,786 | 1/1939 | Mannes | 96—69 |
| 2,203,656 | 6/1940 | MacAdam | 96—69 |
| 2,218,229 | 10/1940 | Carroll | 96—69 |
| 2,231,684 | 2/1941 | Schinzel | 96—69 |
| 2,239,699 | 4/1941 | Carroll | 96—69 |
| 2,340,656 | 2/1944 | Gaspar | 96—68 |
| 2,403,722 | 7/1946 | Jelley | 96—69 |
| 2,423,465 | 7/1947 | Murray | 96—69 |
| 2,725,296 | 11/1955 | Kendall | 96—68 |

NORMAN G. TORCHIN, Primary Examiner

A. T. SURO PICO, Assistant Examiner

U.S. Cl. X.R.

96—16, 23, 68, 84 R